A. VERSTRAETE.
CRULLER CUTTER.
APPLICATION FILED NOV. 13, 1914.

1,140,219.

Patented May 18, 1915.

WITNESSES

INVENTOR
Arthur Verstraete
BY
ATTORNEYS

UNITED STATES PATENT OFFICE.

ARTHUR VERSTRAETE, OF NEW ROCHELLE, NEW YORK.

CRULLER-CUTTER.

1,140,219.

Specification of Letters Patent.

Patented May 18, 1915.

Application filed November 13, 1914. Serial No. 871,871.

*To all whom it may concern:*

Be it known that I, ARTHUR VERSTRAETE, a subject of the King of Belgium, and a resident of New Rochelle, in the county of Westchester and State of New York, have invented a new and Improved Cruller-Cutter, of which the following is a full, clear, and exact description.

The invention relates to hand-operated and directed bakers' implements, and its object is to provide a new and improved cruller cutter arranged to permit the baker to quickly and accurately cut a plurality of cruller blanks from a sheet of dough without incurring any waste of the dough.

In order to accomplish the desired result, use is made of a board for supporting a sheet of dough and provided with a raised rim for confining the sheet of dough on the board, and a cutter provided with a plurality of contiguous dies, for cutting a corresponding plurality of blank crullers out of the sheet of dough at each operation, the board being of a size corresponding to a multiple of the size of the cutter, to permit of cutting the entire sheet of dough into cruller blanks without waste, the cutter being guided by the raised rim of the board.

A practical embodiment of the invention is represented in the accompanying drawings forming a part of this specification, in which similar characters of reference indicate corresponding parts in all the views.

Figure 1:
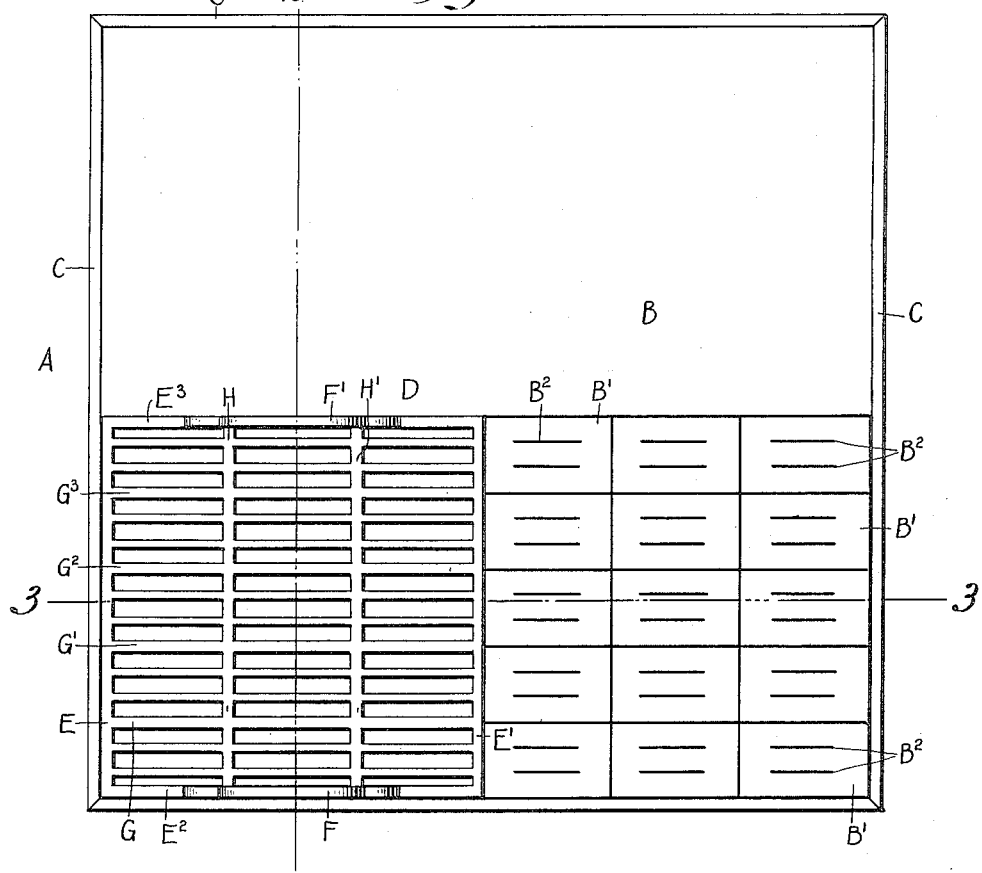
Figure 2:
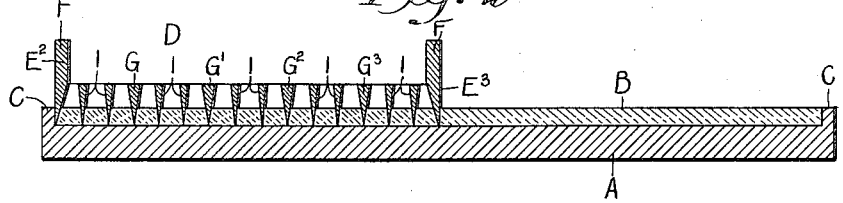
Figure 3:
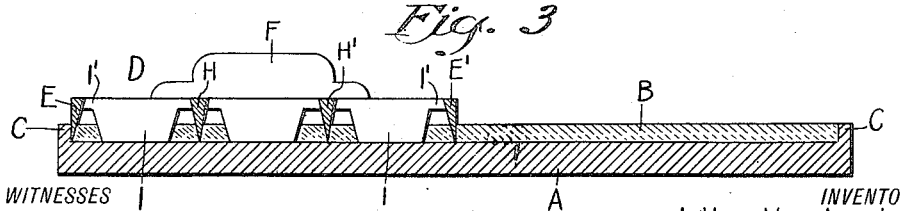

Figure 1 is a plan view of the cruller cutter in position on the board supporting the sheet of dough; Fig. 2 is a cross section of the same on the line 2—2 of Fig. 1; and Fig. 3 is a sectional side elevation of the same on the line 3—3 of Fig. 1.

A board A for supporting a sheet of dough B is provided with a rim C for confining the sheet of dough B on the top of the board A. The board A is preferably rectangular in shape and use is made of a cutter D likewise of rectangular shape and provided with a plurality of contiguous dies for cutting a corresponding plurality of blank crullers out of the sheet of dough B at each operation, the board being of a size corresponding to a multiple of the size of the cutter to permit of cutting the entire sheet of dough into cruller blanks without waste, the rim C forming a guide for the cutter D, as will be readily understood by reference to the drawings. As shown in Fig. 1, the board A is four times the size of the cutter D and consequently four operations of the cutter D cut the sheet of dough B accurately into a large number of cruller blanks B'.

The cutter D consists of a rectangular frame formed of sides E, E' and ends $E^2$, $E^3$, having cutting edges at the bottom for cutting the dough. Handles F and F' are preferably mounted on the top of the cutter frame, preferably at the ends $E^2$, $E^3$ to permit the baker to conveniently manipulate the cutter D for cutting the sheet of dough B into cruller blanks B'. The frame of the cutter D is divided into a plurality of dies by the use of longitudinal partitions G, G', $G^2$, $G^3$, identical with the dies E, E' and transverse partitions H, H' integral with the ends $E^2$ and $E^3$ and with the partitions G, G' $G^2$ and $G^3$. The bottoms of the partitions G, G', $G^2$, $G^3$, H and H' are provided with cutting edges extending in the plane of the cutting edges of the sides and ends E, E', $E^2$ and $E^3$ of the frame of the cutter D. By the arrangement described the cutter D is divided into fifteen dies to permit of cutting fifteen individual cruller blanks B' out of the sheet of dough B at each operation of the cruller cutter.

In order to provide each cruller blank B' with spaced slits or cuts $B^2$, use is made of slitting knives I, preferably two in number, for each die. The cutting edges of the slitting knives I are in the plane of the cutting edges of the sides, ends and partitions of the frame, and the cutting edges of the slitting knives I are spaced from the adjacent sides of a die, as will be readily understood by reference to Fig. 3. The back I' of each slitting knife I is integral with the corresponding sides E, E' and the corresponding partitions H, H', as will be readily understood by reference to Figs. 1 and 3. The inner faces of the sides E, E' and ends $E^2$, $E^3$ are beveled, and the partitions G, G', $G^2$, $G^3$, H and H' are wedge-shaped and likewise the slitting knives I, so that the dough is not liable to adhere to the several parts when lifting the cutter out of engagement with the dough after the latter has been cut to form the individual cruller blanks B'.

In using the implement the sheet of dough B is placed in position on the board A to completely fill the board up to the rim C. The baker now takes hold of the handles F, F' of the cutter and presses the latter downward into the dough with two adjacent sides and ends adjacent the corresponding sides and ends of the rim C, as will be readily understood by reference to the drawings. The cutter D is pressed downward until the cutting edges reach the surface of the board A, and then the cutter is raised and is next again engaged with the dough as above described, and this operation is repeated until the entire sheet of dough is cut into individual cruller blanks B', each of which is provided with two slits B² made by the slitting knives I, of each die.

By arranging the board and the cutter as shown and described, waste of dough is entirely prevented and a large number of cruller blanks are cut very quickly and accurately out of the dough.

It is understood that the slits B² in each cruller blank permit of conveniently twisting the blank preparatory to forming the cruller.

Having thus described my invention, I claim as new and desire to secure by Letters Patent:

A cruller cutter, comprising a rectangular frame provided at the top with handles, the sides and ends of the frame having knife edges at the bottom, longitudinal and transverse partitions extending within the said frame and attached to the outer sides and ends of the frame, the said partitions dividing the frame into a plurality of contiguous blank cutters, each of the size of a cruller blank, the partitions having knife edges at the bottom and spaced slitting knives in each individual die, the ends of the cutting edge of each slitting knife being spaced from the adjacent sides of the cutter and the backs of the said slitting knives having sidewise projecting end portions integral with the corresponding sides of the cutter, the cutting edges of the frame, partitions and slitting knives extending in the same horizontal plane.

In testimony whereof I have signed my name to this specification in the presence of two subscribing witnesses.

ARTHUR VERSTRAETE.

Witnesses:
 THEO. G. HOSTER,
 PHILIP D. ROLLHAUS.